US012781838B2

(12) United States Patent
Folkesson

(10) Patent No.: US 12,781,838 B2
(45) Date of Patent: Nov. 3, 2026

(54) TRANSMISSION ARRANGEMENT FOR AN ELECTRICALLY PROPELLED VEHICLE

(71) Applicant: VOLVO TRUCK CORPORATION, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/082,380

(22) Filed: Mar. 18, 2025

(65) Prior Publication Data

US 2025/0297672 A1 Sep. 25, 2025

(30) Foreign Application Priority Data

Mar. 21, 2024 (EP) .................................... 24165133

(51) Int. Cl.
*B60K 1/02* (2006.01)
*B60K 17/02* (2006.01)
(Continued)

(52) U.S. Cl.
CPC ............. *F16H 37/065* (2013.01); *B60K 1/02* (2013.01); *B60K 17/02* (2013.01); *B60K 17/08* (2013.01);
(Continued)

(58) Field of Classification Search
CPC ..... F16H 3/091–093; F16H 2200/2007; F16H 3/66; F16H 2200/0043; F16H 2200/2041
See application file for complete search history.

(56) References Cited

U.S. PATENT DOCUMENTS 11,685,247 B2 * 6/2023 Bergström ............ F16H 37/046 475/149
2003/0100395 A1 * 5/2003 Hiraiwa ................. B60K 6/445 903/910
(Continued)

FOREIGN PATENT DOCUMENTS

CN 209414526 U * 9/2019
CN 112477571 A 3/2021
(Continued)

OTHER PUBLICATIONS

Extended European Search Report for European Patent Application No. 24165133.0, mailed Jul. 1, 2024, 9 pages.

*Primary Examiner* — Ernesto A Suarez
*Assistant Examiner* — Lillian T Nguyen
(74) *Attorney, Agent, or Firm* — Sage Patent Group

(57) ABSTRACT

A transmission arrangement for a vehicle, the transmission arrangement comprising a first input shaft comprising a first input shaft gear wheel rotationally fixed to the first input shaft, a second input shaft comprising a second input shaft gear wheel rotationally fixed to the second input shaft, a transmission shaft drivingly connectable to a pair of wheels of the vehicle, the transmission shaft comprising a transmission gear wheel rotationally fixed to the transmission shaft, the transmission gear wheel being arranged in meshing engagement with the first input shaft gear wheel, and a countershaft comprising a first countershaft gear wheel arranged in meshing engagement with the transmission gear wheel, and a second countershaft gear wheel arranged in meshing engagement with second input shaft gear wheel, wherein the second input shaft is drivingly connectable to the transmission shaft via the countershaft.

19 Claims, 4 Drawing Sheets

(51) Int. Cl.
*B60K 17/08* (2006.01)
*F16H 37/06* (2006.01)

(52) U.S. Cl.
CPC ................ *F16H 2200/0021* (2013.01); *F16H 2200/0043* (2013.01); *F16H 2200/2007* (2013.01)

(56) References Cited

U.S. PATENT DOCUMENTS

| | | | | |
|---|---|---|---|---|
| 2017/0334280 | A1* | 11/2017 | Lecomte ................ | B60K 6/547 |
| 2020/0096084 | A1* | 3/2020 | Engerman ............... | F16H 3/006 |
| 2020/0180421 | A1* | 6/2020 | Dempel ................. | B60K 6/547 |
| 2021/0162852 | A1* | 6/2021 | Dempel ................. | B60K 6/547 |
| 2021/0162862 | A1 | 6/2021 | Terrat et al. | |
| 2024/0026960 | A1* | 1/2024 | Steffens .............. | F16H 37/0806 |
| 2025/0257791 | A1* | 8/2025 | Folkesson ................ | F16H 3/66 |

FOREIGN PATENT DOCUMENTS

| | | | | | |
|---|---|---|---|---|---|
| CN | 115306872 | A | * | 11/2022 | ......... F16H 61/0403 |
| CN | 115384295 | A | | 11/2022 | |
| DE | 102021111060 | A1 | | 4/2022 | |
| DE | 102022105304 | A1 | * | 5/2022 | ............. B60K 17/08 |
| DE | 102022108340 | A1 | | 5/2022 | |
| DE | 102022203375 | A1 | | 10/2023 | |
| DE | 102023104451 | A1 | | 10/2023 | |
| EP | 3587157 | B1 | | 6/2021 | |
| EP | 4253792 | A1 | | 10/2023 | |
| JP | 2013108604 | A | | 6/2013 | |

* cited by examiner

TRANSMISSION ARRANGEMENT FOR AN ELECTRICALLY PROPELLED VEHICLE

CROSS REFERENCE TO RELATED APPLICATION

This application claims foreign priority to European Patent Application No. 24165133.0 filed on Mar. 21, 2024, the disclosure and content of which is incorporated by reference herein in its entirety.

TECHNICAL FIELD

The disclosure relates generally to vehicle transmissions. In particular aspects, the disclosure relates to a transmission arrangement for an electrically propelled vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Propulsion systems for vehicles are continuously developed to meet the demands from the market. A particular aspect relates to the emission of environmentally harmful exhaust gases. Therefore, vehicles propelled by electric traction motors have been increasingly popular, both for cars as well as for heavy duty vehicles.

For cars, a transmission may conventionally comprise a fixed ratio between an input shaft and an output shaft to provide a desired output torque and a desired cruise speed. However, for heavy duty vehicles, the demands for startability and a suitable rotational speed of the electric machine requires a transmission that enables for a plurality of gear states due to e.g. the relatively heavy weight of this type of vehicle. The omission of a transmission arrangement for a heavy duty vehicle would, for example, require the use of powerful and expensive electric traction motors.

Conventional transmission arrangements for heavy duty vehicle are either bulky or are not providing for the desired functionalities, such as enabling for a desirable gear ratio. There is thus a desire to provide a compact transmission arrangement that can enable for desired speed- and torque ranges.

SUMMARY

According to a first aspect of the disclosure, there is provided a transmission arrangement for a vehicle, the transmission arrangement comprising a first input shaft drivingly connectable to a first electric traction motor, the first input shaft comprising a first input shaft gear wheel rotationally fixed to the first input shaft, a second input shaft drivingly connectable to a second electric traction motor, the second input shaft comprising a second input shaft gear wheel rotationally fixed to the second input shaft, a transmission shaft drivingly connectable to a pair of wheels of the vehicle, the transmission shaft comprising a transmission gear wheel rotationally fixed to the transmission shaft, the transmission gear wheel being arranged in meshing engagement with the first input shaft gear wheel, and a countershaft comprising a first countershaft gear wheel arranged in meshing engagement with the transmission gear wheel, and a second countershaft gear wheel arranged in meshing engagement with second input shaft gear wheel, wherein the second input shaft is drivingly connectable to the transmission shaft via the countershaft.

The first aspect of the disclosure may seek to at least partly mitigate the above described problem with transmissions that are either bulky or do not enable for sufficient functionalities. A technical benefit may include that the inclusion of a countershaft enables for the use of an additional input shaft, i.e. the above defined second input shaft, connectable to a second electric traction motor. This can in turn enable for an increased flexibility of selecting a desirable gear ratio depending on the mode of operation. In particular, the transmission arrangement can be either solely driven by the first input shaft or driven by the first and second input shafts in combination. The transmission arrangement can alternatively be driven solely by the second input shaft if using a first electric traction motor that is electrically excited. In such a case, the first electric traction motor can be electrically disconnected and idling, while the second input shaft is drivingly connected to the transmission shaft via the countershaft.

Furthermore, by including a countershaft, end positions of the first and second input shafts, at which end positions the respective first and second electric traction motors are drivingly connectable, can be arranged at opposite axial sides of the transmission arrangement. As such, a less bulky transmission arrangement can be provided.

In the following and throughout the description, the wording "rotationally connected to" and "rotationally connect" should be interpreted such that a component of the transmission arrangement is connected to another component of the transmission arrangement in such a way that the components rotate in the same direction and with the same rotational speed. The components thus rotate in the same direction and with the same rotational speed when being rotationally connected to each other. The wording "connectable" should thus be construed as connectable by a clutch, the components are hence selectively connectable. Further, the definition "rotationally fixed to" should be construed such that two components are directly connected to each other where no relative rotation can be obtained between the two components. As an example, the first input shaft gear wheel is fixed in a rotational direction to the first input shaft. When a gear wheel is rotationally fixed to a shaft, the gear wheel may be integrally formed with the shaft, or press-fitted to the shaft, etc.

Further, the wording "drivingly connected to" and "drivingly connectable to" should be interpreted as two components being either directly connected to each other, i.e. the components rotate in the same direction and with the same rotational speed, or connected to each other with one or more gear wheels therebetween. In the latter example, when a first component rotates, then a second component also rotates with a ratio to the first component. The first and second components may not necessarily rotate in the same direction and with the same rotational speed.

Optionally in some examples, including in at least one preferred example, the transmission arrangement further comprises a countershaft clutch arranged to selectively drivingly connect the second input shaft to the transmission shaft. As will be described below, the countershaft clutch may be arranged to selectively rotationally connect the second countershaft gear wheel to the countershaft. Alternatively, the countershaft clutch may be arranged to selectively rotationally connect the first countershaft gear wheel to the countershaft. A technical benefit may include that a clutch may be controlled in a conventional manner to drivingly connect the second input to the transmission shaft when there is a desire to use the second electric traction motor to apply a torque to the transmission shaft.

Optionally in some examples, including in at least one preferred example, the countershaft clutch is arranged to selectively rotationally connect the second countershaft gear wheel to the countershaft. A technical benefit may include that the countershaft clutch can be fully or partly embedded inside the second countershaft gear wheel.

Optionally in some examples, including in at least one preferred example, the second countershaft gear wheel is supported to the countershaft by a bearing arrangement.

Optionally in some examples, including in at least one preferred example, the bearing arrangement is a needle bearing arrangement. A technical benefit may include that needle bearings may have higher load capacity compared to e.g. ball bearings of similar size due to their larger contact area between the rollers and the races. Also, needle bearings have a compact design which allows them to handle high radial loads in a smaller spaces. Thus, needle bearing may be advantageous in this position as the space is relatively constrained, while the needle bearing can support relatively high loads and high rotational speeds.

Optionally in some examples, including in at least one preferred example, the countershaft clutch is arranged to selectively rotationally connect the first countershaft gear wheel to the countershaft. A technical benefit may include that bearings supporting the countershaft are substantially stationary when the countershaft clutch is disengaged, thereby reducing energy losses.

Optionally in some examples, including in at least one preferred example, the second input shaft gear wheel and the second countershaft gear wheel form a first reduction gear stage in which, during operation of the transmission arrangement, the second input shaft gear wheel rotates at a higher rotational speed compared to a rotational speed of the second countershaft gear wheel. A technical benefit may include that the second electric machine can be allowed to rotate faster. The size of an electric machine is dependent on the maximum torque it is able to produce. High rotational speed can thus compensate for lower torque levels and the second electric machine can hereby be made smaller which in turn reduces the cost for such electric machine.

Optionally in some examples, including in at least one preferred example, the transmission arrangement further comprising a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are rotationally connectable to the transmission shaft, and wherein the first planet carrier is rotationally connected to the output shaft. A technical benefit may include that three gear states can be obtained by the use of the first planetary gear set. In addition, a planetary gear set is compact in its design, whereby the three gear states can be obtained with a compact transmission arrangement.

Optionally in some examples, including in at least one preferred example, the first sun gear of the first planetary gear set is rotationally connectable to the transmission shaft by a second clutch of the transmission arrangement.

Optionally in some examples, including in at least one preferred example, the first ring gear of the first planetary gear set is rotationally connectable to the transmission shaft by a third clutch of the transmission arrangement. A technical benefit may include that the first ring gear is rotationally connected to the transmission shaft for some gear states but not for others.

Optionally in some examples, including in at least one preferred example, the first ring gear of the first planetary gear set is rotationally connectable to the stationary member via the third clutch.

The third clutch should also be construed as being able to assume a neutral position in which the third clutch is not connected to any one of the transmission shaft or the stationary member. In such case, the ring gear rotates without direct interaction with the transmission shaft or the stationary member.

Optionally in some examples, including in at least one preferred example, the transmission arrangement further comprising a crawler unit comprising a plurality of gear members, the crawler unit being drivingly connectable between the first planetary gear set and the output shaft by a first clutch. A technical benefit may include that the crawler unit can advantageously provide a large speed reduction between the input shaft and the output shaft. The large speed reduction enables for large weight vehicles to start from standstill in a desirable manner.

Optionally in some examples, including in at least one preferred example, the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier. A technical benefit may include that a crawler unit with a first clutch that causes the first ring gear to rotate in an opposite direction compared to a rotational direction of the first planet carrier when the first clutch is engaged may further increases the speed reduction between the input shaft and the output shaft. A technical benefit is thus that the wheels of the vehicle can be provided with a high torque during crawling when the first clutch is engaged.

In the above, when one of the plurality of gear members of the crawler unit is rotationally connected to the stationary member, the gear member of the crawler unit is also stationary which should be construed as falling within the scope of the definition “rotationally connected to”.

Optionally in some examples, including in at least one preferred example, the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

Optionally in some examples, including in at least one preferred example, the second sun gear is rotationally connected to the first ring gear.

Optionally in some examples, including in at least one preferred example, the second ring gear is rotationally connected to the first planet carrier.

Optionally in some examples, including in at least one preferred example, the second planet carrier is rotationally connectable to the stationary member of the transmission arrangement via the first clutch of the crawler unit.

A technical benefit may include that a large rotation in the opposite direction is provided for the first ring gear, which in turn generates a large ratio between the transmission shaft and the output shaft. In addition, the second sun gear can be provided with a small diameter since it will not be exposed to high torque loads.

Optionally in some examples, including in at least one preferred example, the first input shaft and the second input shaft are arranged in parallel with each other and arranged at radially separate positions. A technical benefit may include, as indicated above, that a compact design is achieved.

According to a second aspect, there is provided a driveline arrangement, comprising a first electric traction motor, a second electric traction motor, and a transmission arrangement according to any one of the examples described above in relation to the first aspect, wherein the first electric traction motor is drivingly connected to the first input shaft and the second electric traction motor is drivingly connected to the second input shaft.

Optionally in some examples, including in at least one preferred example, the first input shaft comprises a first end position and a second end position, the first input shaft gear wheel being arranged in the vicinity of the first end position and the first electric traction motor being driving connected to the first input shaft at the second end position.

Optionally in some examples, including in at least one preferred example, the second input shaft comprises a first end position and a second end position, the second input shaft gear wheel being arranged in the vicinity of the first end position and the second electric traction motor being driving connected to the second input shaft at the second end position.

Optionally in some examples, including in at least one preferred example, the first end position of the first input shaft and the first end position of the second input shaft are oriented axially opposite from each other.

Effects and features of the second aspect are largely analogous to those described above in relation to the first aspect.

According to a third aspect, there is provided a vehicle, comprising a transmission arrangement according to any one of the examples described above in relation to the first aspect, or a driveline arrangement according to the examples described above in relation to the second aspect.

Effects and features of the third aspect are largely analogous to those described above in relation to the first and second aspects.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The following disclosure aims at providing a compact transmission arrangement that can enable for a desirable selection of gear ratios between the input shaft(s) and the output shaft to provide optimum gear ratio and efficiency.

Figure 1:
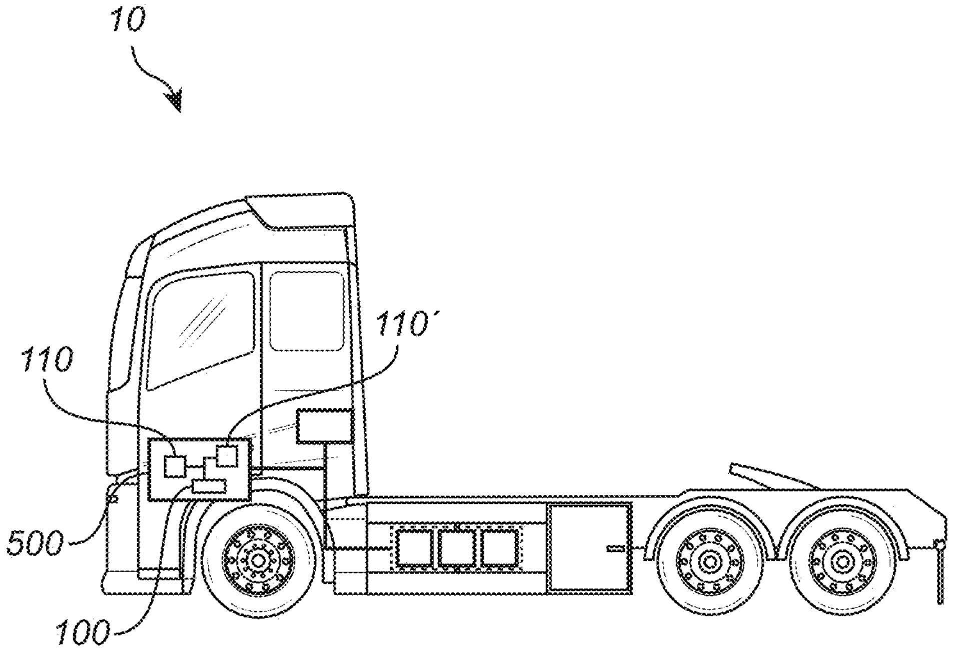
FIG. 1 is an exemplary vehicle according to an example.

With initial reference to FIG. 1, in which an exemplary vehicle 10 is depicted. The exemplified vehicle 10 is configured to be at least partly propelled by a first 110 and a second 110' electric traction motor. As will be evident from the below description, the first electric traction motor 110 as well as the second electric traction motor 110' are drivingly connected to a transmission arrangement 100.

Figure 2:
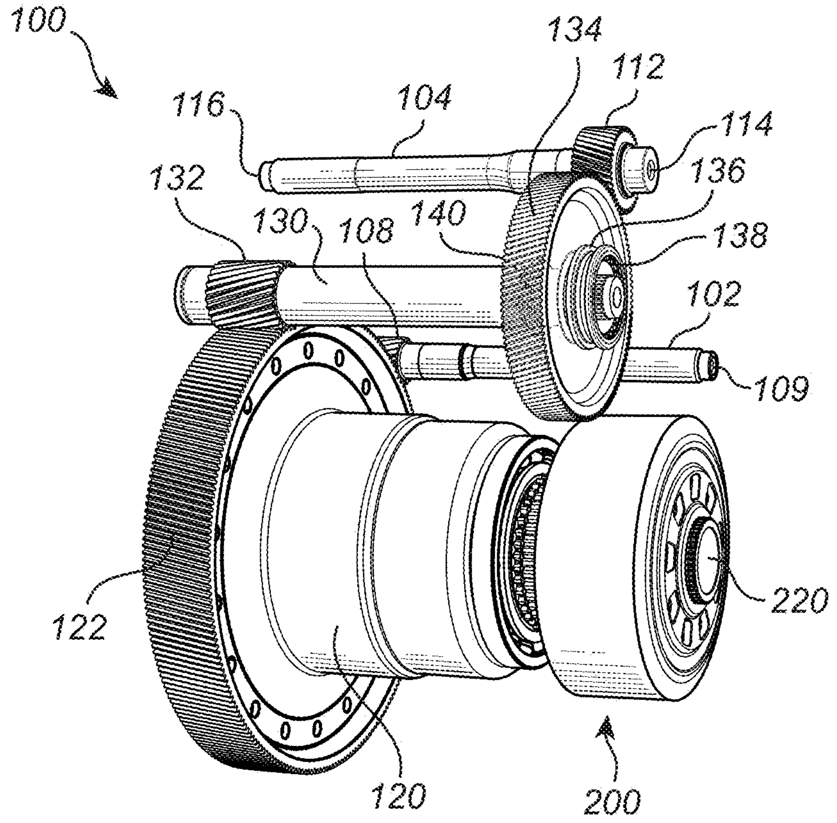
FIG. 2 is an exemplary illustration of a transmission arrangement according to an example.

In order to describe the transmission arrangement in further detail, reference is made to FIG. 2 which is a first example of the transmission arrangement 100. The transmission arrangement 100 comprises a first input shaft 102 and a second input shaft 104. As is further detailed in FIG. 4, the first input shaft 102 is drivingly connected to the first electric traction motor 110 while the second input shaft 104 is drivingly connected to the second electric traction motor 110'.

The first input shaft 102 comprises a first input shaft gear wheel 106 which is rotationally fixed to the first input shaft 102. In detail, the first input shaft gear wheel 106 is arranged in the vicinity of a first end position 108 of the first input shaft 102, while the first electric traction motor 110 is drivingly connected to the first input shaft 102 at a second end position 109 of the first input shaft 102. The first 108 and second 109 end positions are arranged on opposite axial ends of the first input shaft 102.

The second input shaft 104 comprises a second input shaft gear wheel 112 which is rotationally fixed to the second input shaft 104. In detail, the second input shaft gear wheel 112 is arranged in the vicinity of a first end position 114 of the second input shaft 104, while the second electric traction motor 110' is drivingly connected to the second input shaft 104 at a second end position 116 of the second input shaft 104. The first 114 and second 116 end positions are arranged on opposite axial ends of the second input shaft 104. As can be seen in FIG. 2, the first end position 108 of the first input shaft 102 and the first end position 114 of the second input shaft 104 are hereby oriented axially opposite from each other.

The transmission arrangement 100 also comprises a transmission shaft 120. The transmission shaft 120 is drivingly connectable to a pair of wheels (12 in FIG. 1) of the vehicle 10. As will be evident from the below description in relation to FIG. 4, the transmission shaft 120 may advantageously be drivingly connectable to an output shaft 220 of the transmission arrangement 100 via one or more gear stages, which are schematically depicted in FIG. 2 with reference numeral 200. The output shaft is in turn drivingly connected or drivingly connectable to the pair of wheels 12 of the vehicle 10. The transmission shaft 120 comprises a transmission gear wheel 122. The transmission gear wheel 122 is rotationally fixed to the transmission shaft 120. The transmission gear wheel 122 and the first input shaft gear wheel 106 are arranged in meshing engagement with each other. As such, when the first input shaft gear wheel 106 rotates, the transmission gear wheel rotates 122. In other words, the transmission gear wheel 122 is driven by the first input shaft gear wheel 106. As indicated in FIG. 2, the transmission gear wheel 122 is larger than the first input shaft gear wheel 106. Hereby, the rotational speed of the transmission shaft 120 will be lower/slower than the rotational speed of the first input shaft 102.

Furthermore, the transmission arrangement 100 comprises a countershaft 130. The countershaft 130 is drivingly connectable between the second input shaft 104 and the transmission shaft 120. To put it differently, the second input shaft 104 is drivingly connectable to the transmission shaft 120 via the countershaft 130. In further detail, the countershaft 130 comprises a first countershaft gear wheel 132 and a second countershaft gear wheel 134. In particular, the transmission arrangement preferably comprises a countershaft clutch 136 which is arranged to selectively drivingly connect the second input shaft 104 to the transmission shaft 120. Further details of the countershaft clutch 136, and examples of different positions will be described below. Moreover, the first 132 and second 134 countershaft gear wheels are in the example depicted in FIG. 2 arranged at opposite end positions on the countershaft 130.

The first countershaft gear wheel 132 is arranged in meshing engagement with the transmission gear wheel 122. Hence, when the countershaft 130 rotates, the transmission shaft 120 rotates. As indicated in FIG. 2, the transmission gear wheel 122 is larger than the first countershaft gear wheel 132. Hereby, the rotational speed of the transmission shaft 120 will be lower/slower than the rotational speed of the countershaft 130. The second countershaft gear wheel 134 on the other hand is arranged in meshing engagement with the second input shaft gear wheel 112. As such, when the second input shaft 104 rotates, the second countershaft gear wheel 134 rotates. As indicated in FIG. 2, the second countershaft gear wheel 134 is larger than the second input shaft gear wheel 112. The second input shaft gear wheel 112 and the second countershaft gear wheel 134 form a first reduction gear stage in which, during operation of the transmission arrangement 100 when operating the second electric traction motor, the second input shaft gear wheel 112 rotates at a higher rotational speed compared to a rotational speed of the second countershaft gear wheel 134.

The first countershaft gear wheel 132 is in the example depicted in FIG. 2 rotationally fixed to the countershaft 130. The second countershaft gear wheel 134 is on the hand supported to the countershaft 130 by a bearing arrangement 140. The bearing arrangement 140 is preferably a needle bearing arrangement. The countershaft clutch 136 is, when engaged, rotationally connecting the second countershaft gear wheel 134 to the countershaft 130. Hence, the second countershaft gear wheel 134 is rotationally connectable to the countershaft 130 via the countershaft clutch 136. As such, the countershaft clutch 136 is arranged to selectively drivingly connect the second input shaft 104 to the transmission shaft 120. The countershaft clutch 136 preferably comprises an engaging sleeve 138 which is slidable in an axial direction of the countershaft 130 to rotationally connect and disconnect the second countershaft gear wheel 134 to/from the countershaft 130. When the engaging sleeve 138 is in a disconnected state, the second countershaft gear wheel 136 can rotate without transferring a torque to the countershaft 130.

Figure 3:
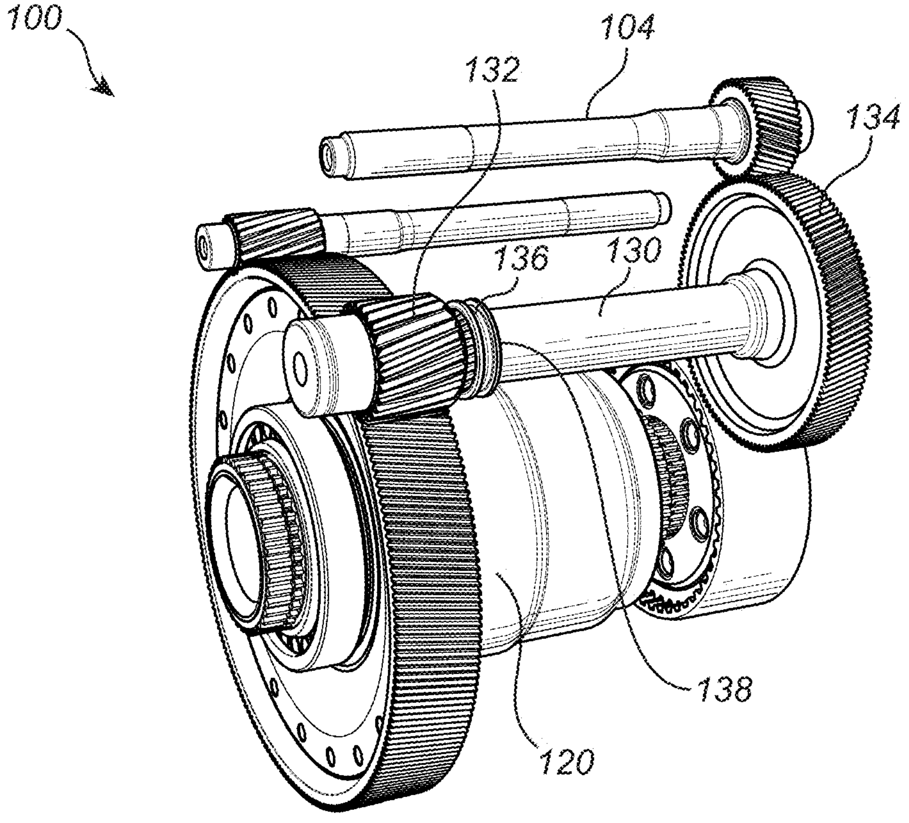
FIG. 3 is an exemplary illustration of a transmission arrangement according to another example.

Reference is now made to FIG. 3 which is an exemplary illustration of the transmission arrangement 100 according to another example. The difference between the transmission arrangement in FIG. 2 and the transmission arrangement in FIG. 3 resides in the countershaft 130 and the components connected thereto. The following will mainly describe the differences between the example in FIG. 3 and the example described above in relation to FIG. 2.

In the example depicted in FIG. 3, the second countershaft gear wheel 134 is rotationally fixed to the countershaft 130. The first countershaft gear wheel 132 is on the hand supported to the countershaft 130 by a bearing arrangement, preferably a needle bearing arrangement. The countershaft clutch 136 is, when engaged, rotationally connecting the first countershaft gear wheel 132 to the countershaft 130. Hence, the first countershaft gear wheel 132 is rotationally connectable to the countershaft 130 via the countershaft clutch 136. As such, the countershaft clutch 136 is arranged to selectively drivingly connect the second input shaft 104 to the transmission shaft 120. The countershaft clutch 136 preferably comprises the above described engaging sleeve 138 which is slidable in an axial direction of the countershaft 130 to rotationally connect and disconnect the first countershaft gear wheel 132 to/from the countershaft 130. When the engaging sleeve 138 is in a disconnected state, the first countershaft gear wheel 136 can rotate without transferring a torque to the transmission shaft 120. In further detail, when the second traction motor propels the second input shaft 104 and the engaging sleeve 138 is in the disconnected state, the second input shaft 104 and the countershaft 130 rotate but without transferring a torque to the transmission shaft 120.

Figure 4:
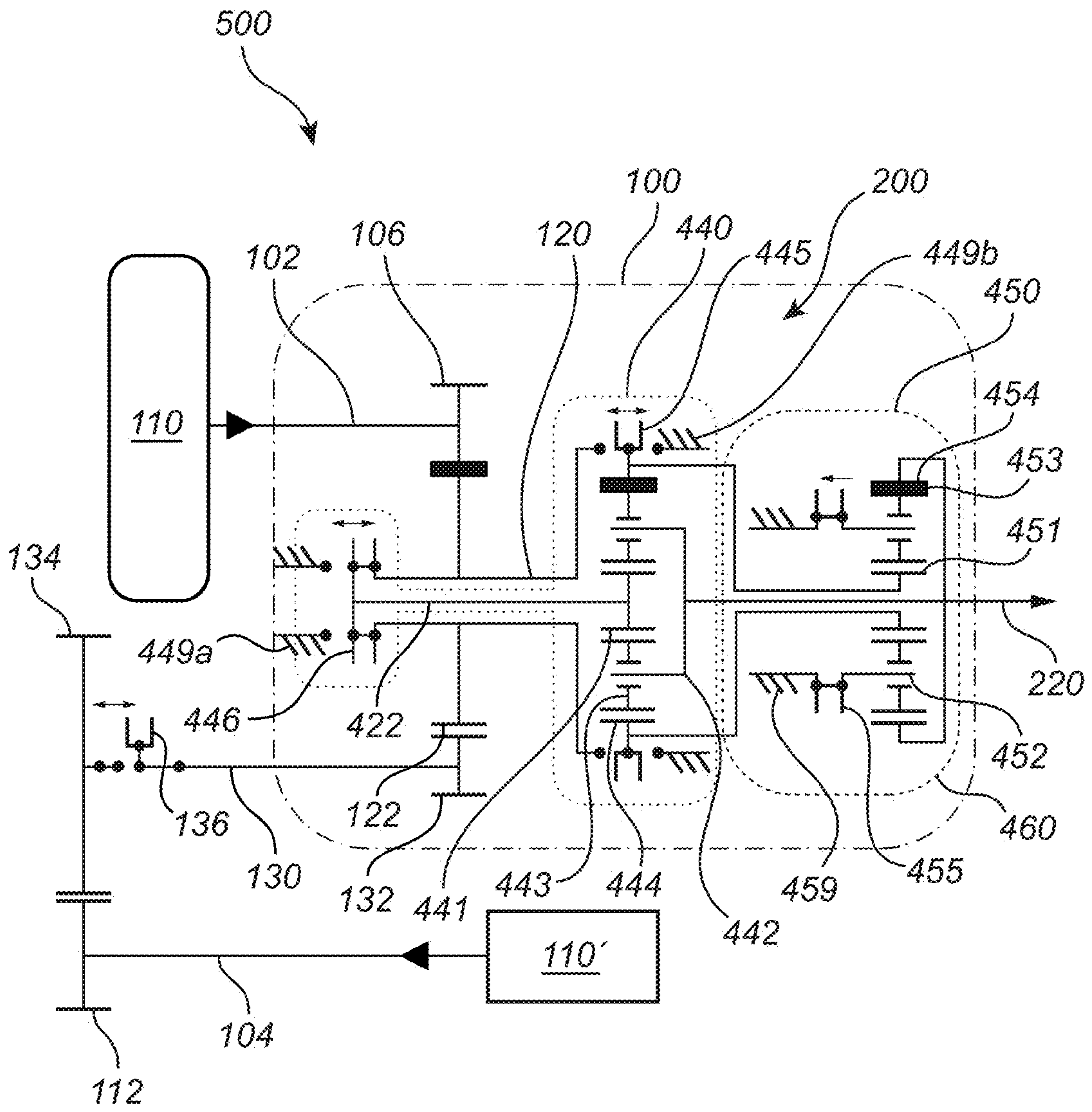
FIG. 4 is an exemplary illustration of the transmission arrangement in FIG. 2 with further details according to an example.

Reference is now made to FIG. 4 which is an exemplary illustration of the transmission arrangement 100 in FIG. 2 with further details included according to an example. The illustration in FIG. 4 also illustrates a driveline arrangement 500 comprising the transmission arrangement 100 and the first 110 and second 110' electric traction motors. It should be readily understood that the example in FIG. 3 is equally applicable to the transmission arrangement 100 in FIG. 4 which is readily understood for the skilled reader.

In addition to the above description in relation to FIGS. 2 and 3, the transmission arrangement 100 comprises the above described gear stages 200. In particular, the transmission arrangement 100 comprises a first planetary gear set 440, which first planetary gear set 440 comprises a first sun gear 441, a first ring gear 444, and a first planet carrier 442 carrying a first set of planet gears 443. The first set of planet gears 443 are in meshing engagement with the first ring gear 444 and the first sun gear 441. The transmission shaft 120 is preferably hollow to accommodate an additional shaft 422.

Moreover, the transmission arrangement 100 also comprises a crawler unit 450. The crawler unit 450 comprises a plurality of gear members 451, 453, 454. In the example depicted in FIG. 4, the plurality of gear members are arranged as gear members of a second planetary gear set 460. The second planetary gear set 460 comprises a second sun gear 451, a second ring gear 454 and a second planet carrier 452 carrying a second set of planet gears 453, wherein the second set of planet gears 453 is in meshing engagement with the second ring gear 454 and the second sun gear 451.

Further, the second sun gear 451 is rotationally connected to the first ring gear 444. The second planet carrier 452 is rotationally connectable to a stationary member 459 via a first clutch 455 of the crawler unit 450. The stationary member 459 may be a transmission housing (not shown) accommodating the transmission arrangement 100. The second ring gear 454 is rotationally connected to the first planet carrier 442. The first planet carrier 442 is rotationally connected to the output shaft 220, whereby the second ring gear 454 is also rotationally connected to the output shaft 220.

Turning again to the first planetary gear set 440. The first sun gear 441 of the first planetary gear set 440 is rotationally connected to the above described additional shaft 422. The additional shaft 422 is rotationally connectable to the transmission gear wheel 122 of the transmission shaft 120 by a second clutch 446. As such, the first sun gear 441 is rotationally connectable to the transmission gear wheel 122 via the second clutch 446. The second clutch 446 is further configured to rotationally connect the first sun gear 441 to the stationary member 449*a*. Moreover, the first ring gear 444 of the first planetary gear set 440 is rotationally connectable to the transmission shaft 120 by a third clutch 445. As such, the third clutch 445 is configured to rotationally connect the first ring gear 444 to the transmission gear wheel 122 of the transmission shaft 120. The third clutch 445 is further configured to rotationally connect the first ring gear 444 to the stationary member 449*b*. In addition, the third clutch 445 is also configured to assume a neutral position in which the first ring gear 444 is not rotationally connected to any one of the transmission gear wheel 122 and the stationary member 449, i.e. the first ring gear 444 rotates freely.

The above describe stationary member 449*a* to which the second clutch 446 is connectable, the stationary member 449*b* to which the third clutch 445 is connectable and the stationary member rotationally connected to the second planet carrier 452 may be one and the same stationary member, such as e.g. the above indicated transmission housing. The stationary members may however be formed by different transmission components as long as being stationary relative to the rotational components to which they are connected or connectable.

The transmission arrangement 100 in the example depicted in FIG. 4 is configured to assume three gear states, i.e. three different speed ratios between the transmission shaft 120 and the output shaft 220, as well as to assume a crawler gear. A first gear state is assumed by positioning the first clutch 455 in neutral position, positioning the second clutch 446 to rotationally connect the first sun gear 441 to the transmission gear wheel 122, and positioning the third clutch 445 to rotationally connect the first ring gear 444 to the stationary member 449*b*. Hereby, the first ring gear 444 is stationary and the first sun gear 441 is driven, whereby a first speed reduction is obtained between the input shaft and the output shaft.

A second gear state is assumed by positioning the first clutch 455 in neutral position, positioning the second clutch 446 to rotationally connect the first sun gear 441 to the stationary member 449*a*, and positioning the third clutch 445 to rotationally connect the first ring gear 444 to the transmission gear wheel 122. Hereby, the first sun gear 441 is stationary and the first ring gear 444 is driven, whereby a second speed reduction is obtained between the input shaft and the output shaft. The second speed reduction is lower/smaller compared to the first speed reduction.

A third gear state is assumed by positioning the first clutch 455 in neutral position, positioning the second clutch 446 to rotationally connect the first sun gear 441 to the transmission gear wheel 122, and positioning the third clutch 445 to rotationally connect the first ring gear 444 to the transmission gear wheel 122. Hereby, a direct gear is obtained where the second gear wheel 432, the first ring gear 444, the first planet carrier 442, and the output shaft 220 all rotate in the same direction.

The crawler gear is assumed by positioning the first clutch 455 to rotationally connect the second planet carrier 452 to the stationary member 459, positioning the second clutch 446 to rotationally connect the first sun gear 441 to the transmission gear wheel 122, and positioning the third clutch 445 to assume the neutral position. Hereby, a third speed reduction is obtained between the input shaft(s) and the output shaft in which the first ring gear 444 and the first planet carrier 442 rotates in opposite directions. The third speed reduction is higher/larger than the first speed reduction. In other words, the output shaft rotates at a lower rotational speed relative to the input shaft(s) for the third speed reduction compared to the relative rotation speed of the input shaft(s) and the output shaft for the first speed reduction.

Thus, three gear states as well as a crawler gear can be obtained between the transmission shaft 120 and the output shaft 220. By controlling the transmission to be operated by solely the first electric traction motor 110 or by the first 110 and second 110' electric traction motors in combination, further speed ratios between the input shafts and the output shaft can be obtained.

EXAMPLE LIST

Example 1. A transmission arrangement for a vehicle, the transmission arrangement comprising: a first input shaft drivingly connectable to a first electric traction motor, the first input shaft comprising a first input shaft gear wheel rotationally fixed to the first input shaft, a second input shaft drivingly connectable to a second electric traction motor, the second input shaft comprising a second input shaft gear wheel rotationally fixed to the second input shaft, a transmission shaft drivingly connectable to a pair of wheels of the vehicle, the transmission shaft comprising a transmission gear wheel rotationally fixed to the transmission shaft, the transmission gear wheel being arranged in meshing engagement with the first input shaft gear wheel, and a countershaft comprising a first countershaft gear wheel arranged in meshing engagement with the transmission gear wheel, and a second countershaft gear wheel arranged in meshing engagement with second input shaft gear wheel, wherein the second input shaft is drivingly connectable to the transmission shaft via the countershaft.

Example 2. The transmission arrangement of example 1, wherein the transmission arrangement further comprises a countershaft clutch arranged to selectively drivingly connect the second input shaft to the transmission shaft.

Example 3. The transmission arrangement of example 2, wherein the countershaft clutch is arranged to selectively rotationally connect the second countershaft gear wheel to the countershaft.

Example 4. The transmission arrangement of any one of the preceding examples, wherein the second countershaft gear wheel is supported to the countershaft by a bearing arrangement.

Example 5. The transmission arrangement of example 4, wherein the bearing arrangement is a needle bearing arrangement.

Example 6. The transmission arrangement of example 2, wherein the countershaft clutch is arranged to selectively rotationally connect the first countershaft gear wheel to the countershaft.

Example 7. The transmission arrangement of any one of the preceding examples, wherein the second input shaft gear wheel and the second countershaft gear wheel form a first reduction gear stage in which, during operation of the transmission arrangement, the second input shaft gear wheel rotates at a higher rotational speed compared to a rotational speed of the second countershaft gear wheel.

Example 8. The transmission arrangement of any one of the preceding examples, the transmission arrangement further comprising a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are rotationally connectable to the transmission shaft, and wherein the first planet carrier is rotationally connected to the output shaft.

Example 9. The transmission arrangement of example 8, wherein the first sun gear of the first planetary gear set is rotationally connectable to the transmission shaft by a second clutch of the transmission arrangement.

Example 10. The transmission arrangement of any one of examples 8 or 9, wherein the first ring gear of the first planetary gear set is rotationally connectable to the transmission shaft by a third clutch of the transmission arrangement.

Example 11. The transmission arrangement of example 10, wherein the first ring gear of the first planetary gear set is rotationally connectable to the stationary member via the third clutch.

Example 12. The transmission arrangement according to any one of examples 8-11, the transmission arrangement further comprising a crawler unit comprising a plurality of gear members, the crawler unit being drivingly connectable between the first planetary gear set and the output shaft by a first clutch.

Example 13. The transmission arrangement of example 12, wherein the first clutch is configured to rotationally connect one of the plurality of gear members of the crawler unit to one of the first ring gear, the first planet carrier or a stationary member of the transmission arrangement, to cause the first ring gear to rotate in an opposite direction compared to a rotational direction of the first planet carrier.

Example 14. The transmission arrangement according to any one of examples 12 or 13, wherein the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

Example 15. The transmission arrangement of example 14, wherein the second sun gear is rotationally connected to the first ring gear.

Example 16. The transmission arrangement according to any one of examples 14 or 15, wherein the second ring gear is rotationally connected to the first planet carrier.

Example 17. The transmission arrangement according to any one of examples 14-16, wherein the second planet carrier is rotationally connectable to the stationary member of the transmission arrangement via the first clutch of the crawler unit.

Example 18. The transmission arrangement according to any one of the preceding examples, wherein the first input shaft and the second input shaft are arranged in parallel with each other and arranged at radially separate positions.

Example 19. A driveline arrangement, comprising a first electric traction motor, a second electric traction motor, and a transmission arrangement according to any one of the preceding examples, wherein the first electric traction motor is drivingly connected to the first input shaft and the second electric traction motor is drivingly connected to the second input shaft.

Example 20. The driveline arrangement of example 19, wherein the first input shaft comprises a first end position and a second end position, the first input shaft gear wheel being arranged in the vicinity of the first end position and the first electric traction motor being driving connected to the first input shaft at the second end position.

Example 21. The driveline arrangement of any one of examples 19 or 20, wherein the second input shaft comprises a first end position and a second end position, the second input shaft gear wheel being arranged in the vicinity of the first end position and the second electric traction motor being driving connected to the second input shaft at the second end position.

Example 22. The driveline arrangement of examples 20 and 21, wherein the first end position of the first input shaft and the first end position of the second input shaft are oriented axially opposite from each other.

Example 23. A vehicle, comprising a transmission arrangement according to any one of examples 1-18, or a driveline arrangement according to any one of examples 19-22.

The terminology used herein is for the purpose of describing particular aspects only and is not intended to be limiting of the disclosure. As used herein, the singular forms “a,” “an,” and “the” are intended to include the plural forms as well, unless the context clearly indicates otherwise. As used herein, the term “and/or” includes any and all combinations of one or more of the associated listed items. It will be further understood that the terms “comprises,” “comprising,” “includes,” and/or “including” when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as “below” or “above” or “upper” or “lower” or “horizontal” or “vertical” may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being “connected” or “coupled” to another element, it can be directly connected or coupled to the other element, or intervening elements may be present. In contrast, when an element is referred to as being “directly connected” or “directly coupled” to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transmission arrangement for a vehicle, the transmission arrangement comprising: a first input shaft drivingly connectable to a first electric traction motor, the first input shaft comprising a first input shaft gear wheel rotationally fixed to the first input shaft, a second input shaft drivingly connectable to a second electric traction motor, the second input shaft comprising a second input shaft gear wheel rotationally fixed to the second input shaft, a transmission shaft drivingly connectable to a pair of wheels of the vehicle, the transmission shaft comprising a transmission gear wheel rotationally fixed to the transmission shaft, the transmission gear wheel being arranged in meshing engagement with the first input shaft gear wheel, and a countershaft comprising a first countershaft gear wheel arranged in meshing engagement with the transmission gear wheel, and a second countershaft gear wheel arranged in meshing engagement with second input shaft gear wheel, wherein the second input shaft is drivingly connectable to the transmission shaft via the countershaft, wherein the transmission arrangement further comprises a first planetary gear set comprising a first sun gear, a first ring gear and a first planet carrier carrying a first set of planet gears, the first set of planet gears being in meshing engagement with the first ring gear and the first sun gear, wherein the first sun gear and the first ring gear are individually rotationally connectable to the transmission shaft, and wherein the first planet carrier is rotationally connected to an output shaft, the transmission arrangement further comprising a crawler unit comprising a plurality of gear members, the crawler unit being drivingly connectable between the first planetary gear set and the output shaft by a first clutch.

2. The transmission arrangement of claim 1, wherein the transmission arrangement further comprises a countershaft clutch arranged to selectively drivingly connect the second input shaft to the transmission shaft.

3. The transmission arrangement of claim 2, wherein the countershaft clutch is arranged to selectively rotationally connect the second countershaft gear wheel to the countershaft.

4. The transmission arrangement of claim 2, wherein the countershaft clutch is arranged to selectively rotationally connect the first countershaft gear wheel to the countershaft.

5. The transmission arrangement of claim 1, wherein the second countershaft gear wheel is supported to the countershaft by a bearing arrangement.

6. The transmission arrangement of claim 5, wherein the bearing arrangement is a needle bearing arrangement.

7. The transmission arrangement of claim 1, wherein the second input shaft gear wheel and the second countershaft gear wheel form a first reduction gear stage in which, during operation of the transmission arrangement, the second input shaft gear wheel rotates at a higher rotational speed compared to a rotational speed of the second countershaft gear wheel.

8. The transmission arrangement of claim 1, wherein the first sun gear of the first planetary gear set is rotationally connectable to the transmission shaft by a second clutch of the transmission arrangement.

9. The transmission arrangement of claim 1, wherein the first ring gear of the first planetary gear set is rotationally connectable to the transmission shaft by a third clutch of the transmission arrangement.

10. The transmission arrangement of claim 9, wherein the first ring gear of the first planetary gear set is rotationally connectable to a stationary member via the third clutch.

11. The transmission arrangement of claim 1, wherein the crawler unit comprises a second planetary gear set, the plurality of gear members of the crawler unit comprising a second sun gear, a second ring gear and a second planet carrier carrying a second set of planet gears, the second set of planet gears being in meshing engagement with the second ring gear and the second sun gear.

12. The transmission arrangement of claim 11, wherein the second sun gear is rotationally connected to the first ring gear.

13. The transmission arrangement of claim 11, wherein the second ring gear is rotationally connected to the first planet carrier.

14. The transmission arrangement of claim 1, wherein the first input shaft and the second input shaft are arranged in parallel with each other and arranged at radially separate positions.

15. A driveline arrangement, comprising a first electric traction motor, a second electric traction motor, and a transmission arrangement according to claim 1, wherein the first electric traction motor is drivingly connected to the first input shaft and the second electric traction motor is drivingly connected to the second input shaft.

16. The driveline arrangement of claim 15, wherein the first input shaft comprises a first end position and a second end position, the first input shaft gear wheel being arranged in a vicinity of the first end position and the first electric traction motor being driving connected to the first input shaft at the second end position.

17. The driveline arrangement of claim 16, wherein the first end position of the first input shaft and the first end position of the second input shaft are oriented axially opposite from each other.

18. The driveline arrangement of claim 15, wherein the second input shaft comprises a first end position and a second end position, the second input shaft gear wheel being arranged in a vicinity of the first end position and the second electric traction motor being driving connected to the second input shaft at the second end position.

19. A vehicle, comprising a transmission arrangement according to claim 1.

* * * * *